United States Patent [19]

Green et al.

[11] 4,067,605
[45] Jan. 10, 1978

[54] DETACHABLE SUN ROOF PANEL FOR AUTOMOBILES

[75] Inventors: Hal Green, Southfield; Kenneth E. Hewson, Troy, both of Mich.

[73] Assignee: Empire Automotive, Inc., Roseville, Mich.

[21] Appl. No.: 583,260

[22] Filed: June 3, 1975

[51] Int. Cl.² ............................................. B60J 7/18
[52] U.S. Cl. .................................. 296/137 B; 49/394;
98/2.14; 292/263; 292/DIG. 5; 292/DIG. 49
[58] Field of Search ....................... 296/137 B, 137 R;
292/DIG. 49, DIG. 5, 113, 247, 263; 98/2.14;
49/394, 381

[56] References Cited
U.S. PATENT DOCUMENTS

| | | | |
|---|---|---|---|
| 3,537,212 | 11/1970 | Gilles | 49/381 |
| 3,913,971 | 10/1975 | Green | 292/207 X |
| 3,955,848 | 5/1976 | Lutz et al. | 296/137 B |

OTHER PUBLICATIONS

Patentanmeldung-V7038V/68b; Traxel; 1-1956.

Primary Examiner—Joseph F. Peters, Jr.
Assistant Examiner—Michael J. Forman
Attorney, Agent, or Firm—Krass & Young

[57] ABSTRACT

A frame extending around an opening in a vehicle roof is adapted to support the perimeter of a curved glass panel to close off the opening. A pair of bayonets projecting in spaced relation to the underside of the forward edge of the panel mates with an aperture in the frame when the panel is inclined with respect to the roof to act as a pivotable hinge allowing motion of the panel between a closed position and that inclined position. A two part fastener for the rear edge of the panel includes a handle pivotably connected to the underside of the panel and a tongue pivotably connected to the handle and adapted to be retained in a lock member in the frame. The handle acts as an over-center linkage to bend the panel against its curvature, forcing its perimeter into intimate engagement with the frame or may be extended to maintain the panel with its rear edge tilted upwardly away from the opening.

18 Claims, 9 Drawing Figures

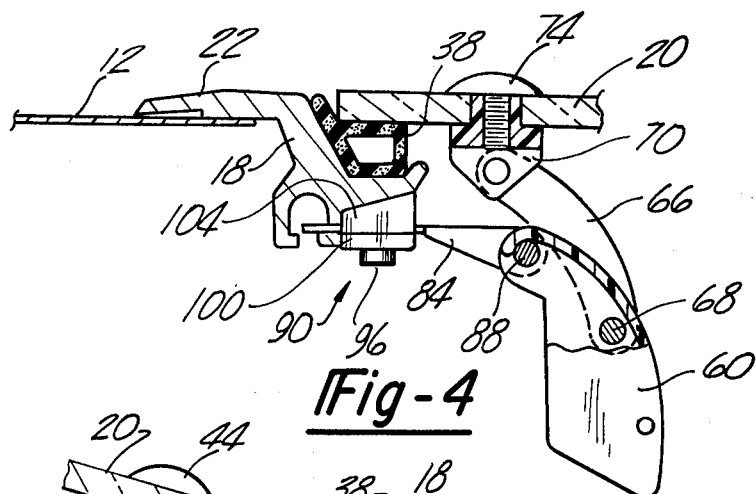
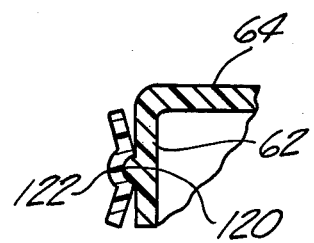
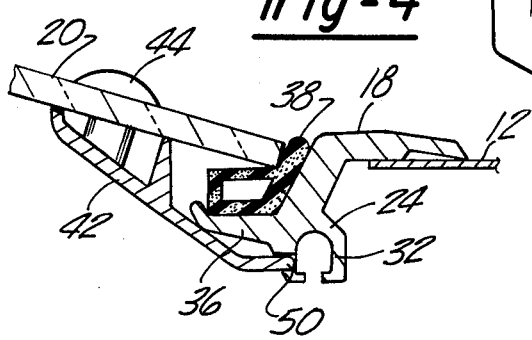
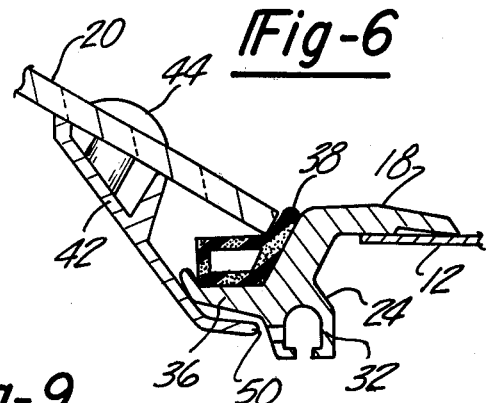
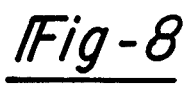
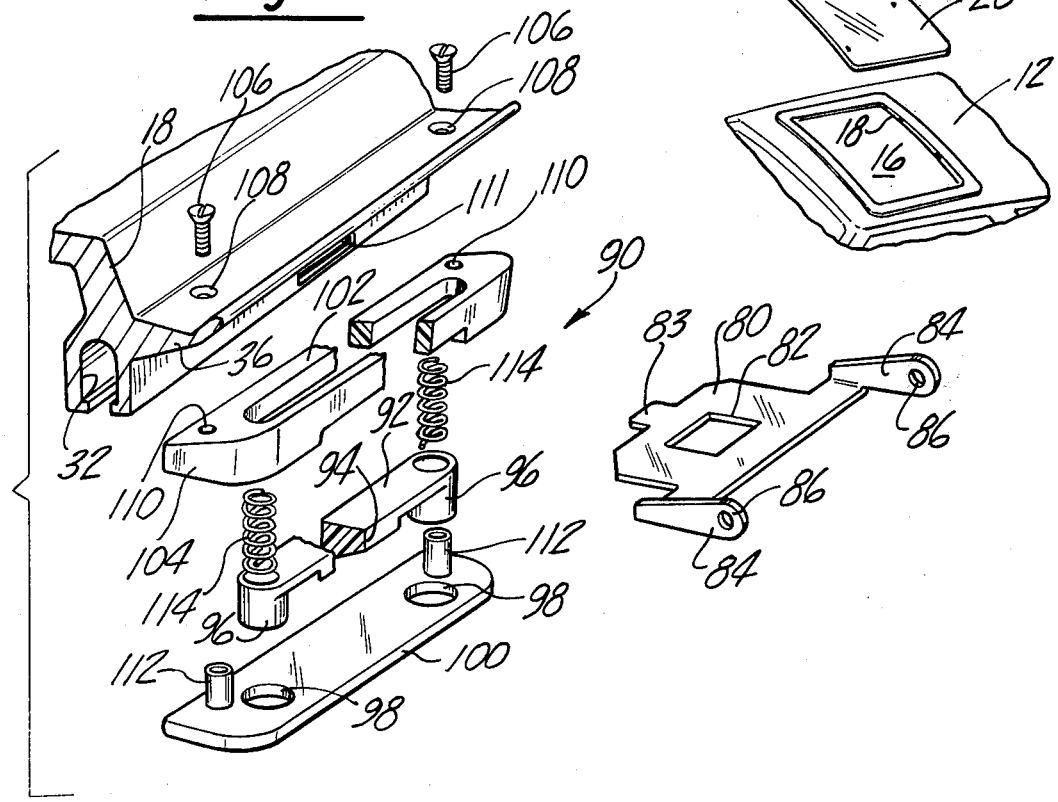

DETACHABLE SUN ROOF PANEL FOR AUTOMOBILES

BACKGROUND OF THE INVENTION

1. Field of the Invention

This invention relates to a removable sun roof panel for a vehicle roof and more particularly to a fastener arragement for supporting the panel in one of a plurality of operative relationships with respect to the roof.

2. Cross Reference to Related Applications

This application relates to improvements in the sun roof arrangement disclosed in co-pending application Ser. No. 444,274 entitled "Detachable Sun Roof Panel for Automobiles" which is assigned to the assignee of the present invention.

3. Prior Art

The above-referenced application discloses an opening in a vehicle roof adapted to receive a removable, transparent sun roof panel. The panel is retained in the framed opening by a bayonet which projects from the underside of the panel on one edge and cooperates with the adjacent panel edge to engage the frame element, and a pivotable handle affixed to the underside of the panel on the opposite edge. The handle may be moved into a closed position wherein it engages the underside of the frame and pulls the panel down against a resilient element forming part of the frame, or an open position wherein it allows the panel to be removed from the opening.

Other sun roof structures employ panels supported for sliding motion between a closed position, covering an opening in the vehicle roof, and an open position in which they are supported in a compartment affixed to the underside of the vehicle roof, behind the opening.

In one form of such sliding sun roof the panel that closes the sun roof opening is supported so that its rear edge may be tilted upwardly at an angle of a few degrees allowing the passenger compartment to be ventilated to a limited degree without moving the panel to its open position.

SUMMARY OF THE INVENTION

The present invention is broadly directed towards apparatus for retaining a removable panel within a sun roof opening which allows the panel to either close off the opening or to be supported with its rear edge tilted upwardly away from the rear edge of the opening so the panel is inclined with respect to the plane of the roof.

As disclosed in the following detailed description of a preferred embodiment of the invention the apparatus includes a frame extending around the perimeter of the aperture and providing a resilient supporting surface, substantially in the plane of the roof, for retaining the edge of the panel.

The panel, formed of tempered glass, is curved across its width, to a greater degree than the roof, so that it presents a concave surface to the frame. A pair of openings are formed in the frame, below the supporting surface, at spaced points along the forward end of the opening and a pair of mating bayonets are affixed to the underside of the forward edge of the panel to project toward the edge of the panel in spaced relation to the underside.

When the forward edge of the panel is supported on the frame and the rear edge of the panel is tilted upwardly at an angle which exceeds the normal tilt angle of the panel, the bayonet ends may be inserted into or retracted from the frame openings and accordingly the panel may be attached to or removed from the opening. As the panel is tilted downwardly into the plane of the roof from this insertion angle, the bayonets and the openings in the frame act as hinges to support the forward end of the panel. When the panel is in its closed position the bayonets engage the frame to force the adjacent underside of the panel against the resilient section.

The two part fastener which separably joins the rear end of the panel to the rear end of the frame includes a push button released lock member affixed to the underside of the frame. The latch handle for the fastener is pivotably connected to a hinge which is in turn pivotably supported on the underside of the rear end of the panel. A tongue adapted to be retained in the lock member and released by the push-button is also pivotably attached to the handle. The handle, the hinge and the tongue thus form a two element linkage which may be disposed in either a closed position wherein the handle lies adjacent the underside of the frame and pulls the panel down against the frame, bending the panel against its curvature to obtain secure engagement with the resilient element of the frame, or in an extended position wherein the handle projects upwardly from the frame and supports the rear end of the panel above the frame so that the panel is inclined with respect to the frame in a ventilating positon. To remove the panel the push-button is depressed releasing the tongue from the lock member and the panel is pivoted about the forward end to a position wherein the bayonet may be removed from the forward frame aperture.

This fastener arrangement is relatively simple in construction so as to be low in cost and reliable in operation and securely support the panel in either its closed or its inclined ventilating position, and allows the relatively simple insertion and removal of the panel from the opening.

The fact that the glass panel is curved so as to present a concave surface to the frame allows an intimate engagement to be obtained between the full perimeter of the panel and the resilient element of the frame, although the panel is only attached to the frame at three points. These three points are located along the curved edges so that the relatively straight side edges make contact with the frame before the front and rear edges are pulled down against the frame by the fastener.

Other objectives, advantages and applications of the present invention will be made apparent by the following detailed description of a preferred embodiment. The description makes reference to the accompanying drawings in which:

FIG. 4 is a sectional view through the rear fastener members for the panel and the frame with the latch handle shown intermediate its closed and tilted positons;

FIG. 5 is a sectional view through the forward attachement between the panel and the roof frame when the panel is in a tilted ventilating position;

FIG. 6 is a sectional view through the forward attachment between the panel and the roof frame when the panel is tilted at an angle allowing insertion or removal of the bayonets from the frame openings;

FIG. 7 is a detailed sectional view through the catch member formed on the latch handle and the linkage, taken along line 7—7 of FIG. 2;

FIG. 8 is an exploded perspective view of the tongue associated with the roof latch, and the components of the associated locking mechanism on the opening frame; and FIG. 9 is a partial perspective view of the roof of the vehicle and sun roof panel in a removed position.

Figure 1:
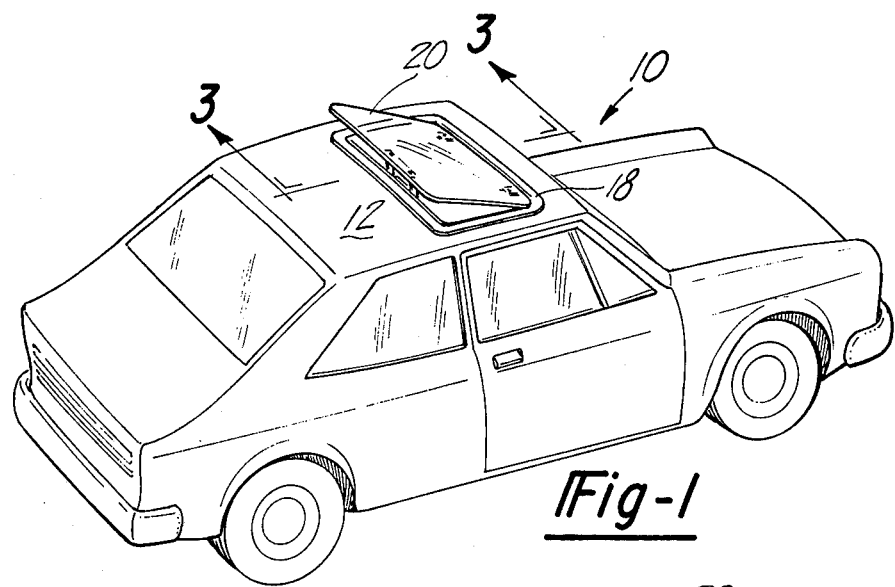
FIG. 1 is a perspective view of an automobile incorporating a sun roof formed in accordance with the present invention, with the panel shown in a tilted ventilating position.

The preferred embodiment of the invention is illustrated as applied to an automobile, generally indicated at 10, although it is equally applicable to trucks, vans, recreational vehicles and the like.

The roof of the automobile is typically formed by an outer sheet metal skin 12 and a fabric headliner 14, disposed under the roof sheet 12 and spaced therefrom. In accordance with the present invention, a sun roof opening 16 is formed in the roof, usually over the front seat of the vehicle and the perimeter of this opening is finished with a frame member 18. The frame is adapted to removably secure a panel 20 preferably formed of a sheet of shatterproof, tempered, tinted glass having dimensions complementary to the opening 16.

As is best seen in FIG. 9, the panel 20 is formed with a gradual curvature across its width so that its concave side faces the frame. Accordingly, the two side edges are straight and the forward and rear edges are bowed away from the frame. The frame may be level across its width or may have a slight crown, but its curvature must be less than that of the panel so that when the panel is lowered into position against the frame its two side edges first abut the side edges of the frame and the centers of its forward and rear edges are slightly raised with respect to the frame. In the preferred embodiment of the invention the curvatures of the panel and frame are such that the centers of the forward and rear edges of the panel are separated from the frame by about ⅜ of an inch in this position.

Figure 2:
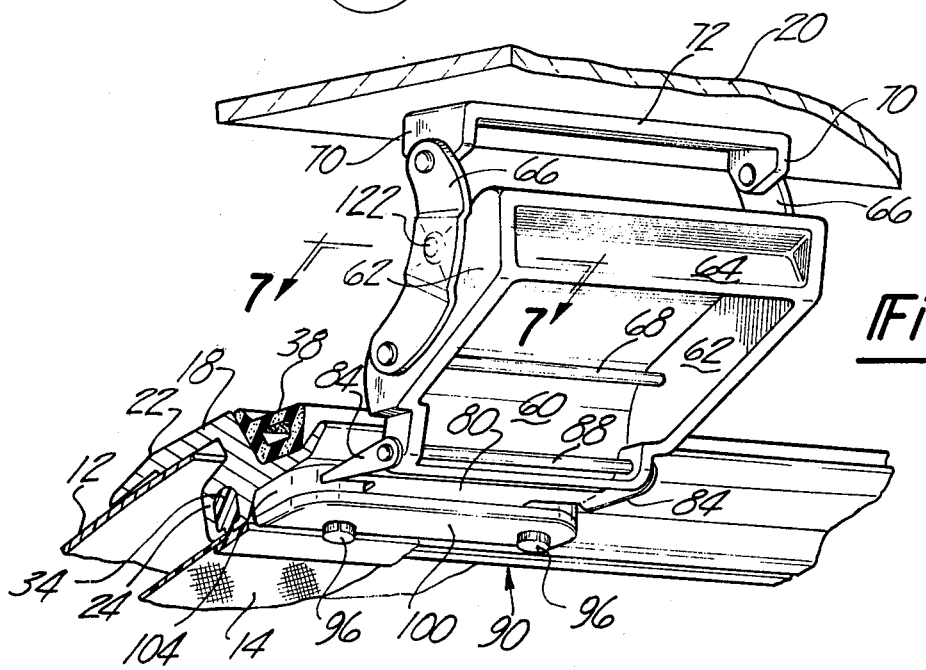
FIG. 2 is a partially sectioned perspective view of the latch mechanism attached to the rear end of the panel and the associated locking mechanism attached to the frame, in a tilted position.

The nature of the frame 18 and the method of attaching it to the roof are disclosed in detail in my co-pending application Ser. No. 444,274, but that description will be outlined here. The frame 18 may be formed of extruded aluminum, bent into a closed section adapted to fit the roof opening 16, and having its ends joined by an appropriate fastening method such as rivets or welding. The frame 18 includes an extending section 22 which overlies the top of the roof 12 at the aperture. A downwardly extending section 24 of the molding has a surface 26 inclined inwardly under the extending section 22, to form a pair of opposed, tapered surfaces adapted to receive tapered wedges 28 which abut the underside of the perimeter of the roof 12 to lock the frame to the roof. The wedges 28 are fixed to the frames 22 by threaded fasteners 30. The downwardly extending section 24 of the frame contains a downwardly opening groove 32 adapted to receive the edge of the fabric headliner 14 which is secured by a plastic molding 34 (FIG. 2).

The frame 18 also includes a section 36 cantilevered into the opening 16, in the plane of the roof, and retaining a resilient molding 38 on its upper surface. The molding 38 is adapted to receive and support the underside of the perimeter of the panel 20.

At two spaced points along the forward edge of the opening 16, horizontal apertures or slots 40 are formed through the side of the downwardly extending section 24 of the frame into the interior of the molding receiving groove 32. These slots 40 are best seen in the FIGS. 3 and 5. the slots may extend for about 1 inch each and the molding 34 is broken at these two sections.

The slots 40 are adapted to cooperate with a pair of extending bayonet members 42 affixed to the underside of the panel 20 at two spaced points on its forward edge. The bayonets are secured to the panel by bolts 44 extending through holes 46 formed in the panel 20 and mating with internally threaded bosses 48 formed on the upper surface of the bayonets 42 whch fit into the holes 46.

The bayonets project toward the edge of the panel 20, at a slight downwardly inclined angle away from the panel and have upwardly turned extreme end sections 50. These ends may be fitted into the frame slots 40, or removed from the frame slots, when the forward edge of the panel 20 is supported against the section of the resilient molding 38 above the slots and the panel is inclined with respect to the roof 12 at an angle of about 30°, as illustrated in FIG. 6. When the panel is then rotated into closer alignment with the roof, the upper edge of the bayonet section 50 presses against the upper edge of the frame slot 40 and pulls the underside of the panel edge against the resilient molding 38. At these lower angles, as illustrated in FIG. 5, the extending section 50 cannot be removed from the slot and the two act as a hinge to allow pivoting motion of the panel relative to the roof.

Figure 3:
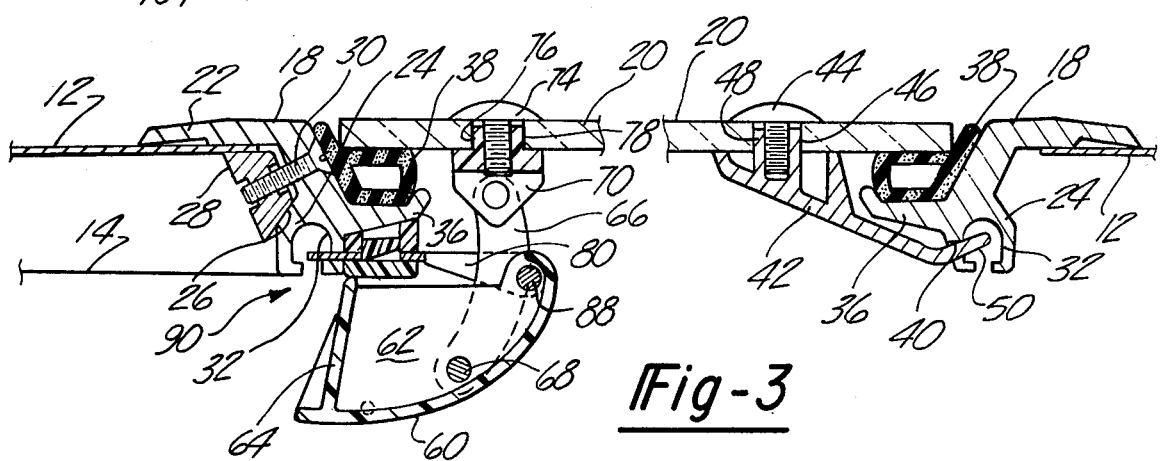
FIG. 3 is a sectional view through the sun roof panel and vehicle roof, taken along line 3—3 of FIG. 1 showing the front and rear attachments between the panel and the roof frame when the panel is in its closed position, with the intermediate section of the panel broken away.

When the perimeter of the panel 20 is in abutment with the resilient molding 38 all the way around the perimeter of the opening 16, the engagement of the bayonet section 50 and the frame 18 forces the edge of the panel into pressured engagement with the resilient section as shown in FIG. 3. To insert the panel 20 into engagement with the roof, or to remove the panel from the roof, the panel is inclined to the angle illustrated in FIG. 5 and the two sections 50 of the bayonets 42 are inserted to be removed from the frame slots 40.

The rear edge of the panel 20 is fastened to the frame 18 by means of a two-part separable fastener centered about a latch member 60. The handle is a flat, thin, curved, injection molded section having a pair of side flanges 62 and an end section 64 which extends transversely to the flanges and to the handle section 60.

A pair of flat, slightly arcuate stamped hinges 66 are pivotably connected to the opposite sides of the latch handle 60 at one of their ends by a pivot pin 68 journaled in holes in the two handle flanges 62 so that its ends extend slightly beyond the flanges. The ends of the pin pass through holes formed in the hinges 66 and are peened. The other ends of the hinges 66 are pivotally supported on two ears 70 which extend downwardly from the ends of a flat sheet metal glass mount 72. The mount 72 is secured to the underside of the panel 20, midway along the rear edge of the panel and slightly inwardly from the edge, by a pair of bolts 74 which mate with internally threaded cylindrical bosses 76 extending upwardly from the mount 72 and passing through holes 78 in the panel.

The latch handle 60 also pivotally supports a flat, sheet metal extending tongue 80. As illustrated in the exploded view of FIG. 7 the tongue has a central catch aperture 82, carrying an extending tab 83, and a pair of ears 84 which are bent normally to the main tongue surface and have holes 86 formed centrally therein. The tongue is pivotally connected to the end of the latch handle 60 opposite to the flange 64 by a pivot pin 88 which extends between the latch handle flanges 62 and has its ends projecting slightly beyond these flanges. The ends of the pin pass through the holes 86 of the tongue and are retained by snap rings.

The tongue 80 is adapted to be inserted and retained within a releasable lock mechanism, generally indicated at 90, fixed to the underside of the frame 18 at the center of the rear of the opening 16.

The lock includes an elongated retainer member 92 having an inclined catch 94 projecting from the bottom of its underside, and having a pair of downwardly extending push buttons 96 extending from its end. The push buttons project through holes 98 formed in a bottom plate 100.

The retainer 92 is supported for vertical sliding motion in a slot 102 formed in a base member 104. The base 104 is fixed to the unerside of the extending section 36 of the edge frame 18 by a pair of screws 106. The screws extend through holes 108 formed in the frame, pass through holes 110 formed in the retainer base, and mate with internally threaded holes formed on a pair of cylindrical bosses 112 which extend upwardly from the top of the bottom plate 100. the retainer 92 is thus sandwiched between the base plate 104 and the bottom plate 100. The retainer 96 is urged downwardly, into abutment with the bottom plate 100, by a pair of springs 114 which have their ends retained in appropriate indentations formed in the base 104 and the retainer 92. Thus, the catch 94 on the bottom of the retainer 92 normally abuts the bottom plate 100. The retainer may be lifted away from the bottom plate, against the bias of the springs, by finger pressure on the push buttons 96 extending through the bottom plate 100. The frame section 32 behind the lock 90 is slotted as at 111, to receive the extreme end of the tongue 80.

The tongue 80 may be inserted between the bottom plate 100 and catch 94, as shown in FIG. 2, so that it abuts the inclined surface of the catch 94 and urges the retainer upwardly, compressing the springs 114. The catch then enters the tongue aperture 82 and moves downwardly under the bias of the springs to lock the tongue against removal. The push buttons may be manually pressed to release the tongue.

When the panel is hingedly retained on the forward edge of the frame by engagement of the bayonet ends 50 in the frame slots 40, and the rear end of the panel is inclined a few degrees with respect to the roof, the tongue 80 may be inserted into the lock 90. The latch handle 60 may then be disposed in one of two fixed positions. In the position shown in FIG. 2, the latch handle is inclined upwardly with respect to the tongue. In this position, a pair of detents 120 formed on the sides of the latch handle flanges 62 (FIG. 7) make frictional engagement with indentations 122 formed outwardly on the center of each of the hinges 66. In this position the rear end of the panel 20 is tilted upwardly with respect to the roof, as shown in FIG. 2, to ventilate the interior of the vehicle.

Alternatively, the flange 64 at the end of the latch handle may be grasped and swung downwardly, through the position illustrated in FIG. 4, to the locked position illustrated in FIG. 3. In this position the bottoms of the flanges 62 abut the underside of the lock base 100 and the handle covers the push buttons 96. The rear edge of the panel 20 is drawn against the resilient molding, compressing the molding. In this position the bayonets also press against the forward edge of the frame at the slots 40.

As the latch is moved into its locked position, forcing the rear edge of the panel downwardly, the panel 20 is bent into conformity with the frame and the side edges of the panel compress the corresponding sections of the molding 38. This provides a secure engagement of the edges of the panel with the molding, along its entire perimeter, despite the fact that the fasteners are only located on the forward and rear edges of the panel.

When the tongue 80 is retained in the lock mechanism 90, the hinges 66 and the section of the latch handle 60 between the pivot pins 68 and 88, act as an over-center linkage. This linkage has a pair of stable states on both sides of the over-center condition wherein the pivot pin 88 which supports the tongue is aligned with the two pivotable ends of the hinges 66. This over-center condition occurs between the closed position of FIG. 3 and the open position of FIG. 4. The latch is thus biased into intimate engagement with the frame when in the locked position of FIG. 3.

To remove the panel 20 the latch is first pulled back, through its over-center condition, to the unlatched positon of FIG. 4. The push buttons 96 are then pressed upwardly, releasing the tongue, and the tongue is removed from the lock. The panel is then swung upwardly about its rear end and the extending sections 50 of the bayonets 42 are removed from the slots 40 freeing the panel.

Having thus described my invention, I claim:

1. A sun roof for a vehicle having an opening in its roof, comprising: a frame extending about the edge of the opening and having a resilient supporting section lying substantially parallel to the vehicle roof; a panel adapted to be supported with its perimeter in abutment to the supporting section of the frame; an aperture formed through the frame in the direction toward the interior of the vehicle from said supporting section, below said resilient supporting section; a bayonet affixed to the unerside of the panel in proximity to the edge thereof, so that its free end projects in the direction of the edge, in spaced relation to the edge, the free end being adapted to be inserted into or removed from said aperture in the frame so than when the free end is inserted into the aperture the spaced edge of the panel abuts the resilient supporting section and a portion of the resilient section is engaged between the bayonet and the spaced panel edge; and cooperating fastener means affixed to the edge of the frame opposite the aperture and the edge of the panel opposite the bayonet, adapted to retain the panel with its entire perimeter abutting the resilient supporting section of the frame when the extending edge of the bayonet is inserted within the aperture in the frame.

2. The sun roof of claim 1 wherein said cooperating fastener means includes a handle member supported on the under-side of the panel and movable between a first position wherein the edge of the panel adjacent to the fastener member is separated from the supporting section of the opening frame, and a second position wherein the panel edge adjacent the fastener member is forced against the supporting section of the opening frame.

3. The sun roof of claim 1 wherein said cooperating fastening means may be placed in a first position wherein the edge of the panel adjacent to the fastener member is forced into abutment with the supporting section of the opening frame, a second position wherein the edge of the panel adjacent the fastener member is supported at a spaced distance with respect to the supporting section of the opening frame so that the panel is inclined with respect to the plane of the roof and the extending section of the bayonet passes through the aperture in the frame, or a third position wherein thr edge of the panel adjacent to the fastener means is free of the supporting section of the frame so that the panel may be inclined with respect to the plane of the roof to an angle wherein the bayonet may be inserted into or removed from the aperture in the frame.

4. The sun roof of claim 1 wherein the cooperating fastening means includes an extending tongue formed on one of its sections and a lock member for the tongue supported on the other section, the lock member including a tongue retaining section supported for movement between a first position wherein it lockingly engages the tongue to prevent its separation from the lock member, and a second position wherein it allows separation of the tongue from the lock member; and bias means normally urging the tongue retaining section toward its first position.

5. The sun roof of claim 4 wherein one of the cooperating fastener sections is pivotably supported with respect to its retaining member so that the edge of the panel adjacent to the cooperating fastener members may be moved between positions wherein it is in abutment to the supporting section of the opening frame and is slightly separated from the supporting section of the opening frame while the tongue is retained within the lock.

6. The sun roof of claim 5 whrein the tongue is pivotably supported on handle member and the handle member is pivotably supported on the panel for motion between a first position wherein the tongue is spaced from the panel by a relatively wide distance so that when the free end of the bayonet is inserted within the frame aperture the panel is inclined with respect to the plane of the roof, and a second position wherein the tongue is relatively closely spaced from the panel and the perimeter of the panel adjacent to the fastener member is in abutment with the supporting section of the frame.

7. The sun roof of claim 6 wherein the handle is pivotably supported on the panel by elongated hinge means having one end pivotably connected to the handle and the other end pivotably connected to the panel and the point of connection of the hinge means with the panel is spaced from the point of connection of the tongue to the handle to form a linkage which passes through an over-center condition in motion of the handle between said first and second positions.

8. The sun roof of claim 1 wherein the panel is curved in one dimension so that its side edges, between the edges containing the bayonet member and the fastener means are straight and contact the frame before the edges supporting the bayonet member and the cooperating fastener means.

9. The sun roof of claim 8 wherein the bayonet member, when inserted in said aperture in the frame, and the cooperating fastener means, are adapted to pull the panel, against its curvature, into intimate contact with the supporting section of the frame along its entire perimeter.

10. The sun roof of claim 8 including a pair of bayonet members supported at spaced points in proximity to the same edge of the frame and a pair of apertures in the frame spaced in the same manner as the bayonet members.

11. A two-part separable fastener for joining one edge of a sun roof panel to a section of a frame extending about an opening in a vehicle roof, comprising: a handle member pivotably supported to the underside of the panel adjacent an edge thereof; an elongated tongue member having one end pivotably attached to the handle member; a lock member having a cavity therein adapted to receive the tongue; a retainer supported within the lock member for motion between a first position wherein it engages the tongue to prevent retraction of the tongue from the lock and a second position wherein it allows motion of the tongue out of the lock; means for urging the retainer member toward its first position; and manually actuable means for moving the retainer to its second position.

12. The separable fastener of claim 11 wherein the handle member is pivotably supported for motion between a first position wherein the edge of the panel adjacent to the handle member is forced into engagement with the frame, and a second position wherein the edge of the panel adjacent to the handle member is spaced with respect to the frame.

13. The separable fastener of claim 11 wherein the handle member is pivotably supported on the underside of the panel by elongated hinge means having one end pivotably supported to the handle and the other end pivotably supported to the panel so that the handle and the hinge means form a linkage pivotably restrained to the tongue and the panel, with the dimensions of the components of the linkage being such that the linkage moves through an over-center condition during motion of the handle between said first and second positions.

14. The separable fastener of claim 11 wherein the manually actuable means for moving the retainer to a second position consists of a push buton attached to the lock means.

15. A sun roof for a vehicle having an opening in its roof, comprising: a rectangular frame extending about the edge of the opening and having a supporting surface lying substantially parallel to the vehicle roof; a rectangular panel curved about an axis extending parallel to two of its sides so than when the panel is brought into contact with the supporting surface of the frame, the two sides which extend parallel to this axis of curvature contact the frame before the other two sides; and cooperating separable fasteners formed on the two sides of th panel which extend normally to the axis of curvature and or two opposed edges of the frame, adapted to retain the panel with its entire perimeter abutting the supporting section of the frame.

16. The sun roof of claim 15 wherein the cooperating fasteners include a bayonet member affixed to the underside of the panel in proximity to the edge thereof, so that its free end projects in the direction of the edge, in spaced relationship to the edge, and an aperture formed in the frame on the side of the frame in a direction toward the interior of the vehicle from the supporting section, the free end of the bayonet member being adapted to be inserted into or removed from said aperture in the frame.

17. The sun roof of claim 16 wherein the cooperating fasteners further include a pair of said bayonet members, affixed to the underside of the same edge of the panel in spaced relationship to one another and a pair of apertures formed through the same edge of the frame with the same spacing as the bayonet members.

18. The sun roof of claim 17 wherein the cooperating fasteners further include a handle member supported on the underside of the panel opposite to that which supports the bayonet members, the handle being movable between a first position wherein the edge of the panel adjacent the handle is separated from the supporting section of the frame, and a second position wherein the edge of the panel adjacent the handle is forced against the supporting section of the frame.

* * * * *

UNITED STATES PATENT OFFICE
CERTIFICATE OF CORRECTION

Patent No. 4,067,605    Dated January 10, 1978

Inventor(s) Hal Green et al

It is certified that error appears in the above-identified patent and that said Letters Patent are hereby corrected as shown below:

Column 4, line 50 "latch member 60" should be --latch handle member 60--.

Column 5, line 3 "Figure 7" should be --Figure 8--.

Column 6, line 47 "unerside" should be --underside--.

Column 7, line 28 "the tongue" should be --said tongue--.

Column 8, line 43 "buton" should be --button--; line 56 "or" should be --on--.

Signed and Sealed this

Eighth Day of August 1978

[SEAL]

Attest:

RUTH C. MASON
*Attesting Officer*

DONALD W. BANNER
*Commissioner of Patents and Trademarks*